(12) United States Patent
Marshall et al.

(10) Patent No.: US 7,098,327 B2
(45) Date of Patent: Aug. 29, 2006

(54) DUAL-FUNCTIONAL ION EXCHANGE RESINS FROM AGRICULTURAL BY-PRODUCTS

(75) Inventors: Wayne E. Marshall, Slidell, LA (US); Lynda H. Wartelle, Metairie, LA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 176 days.

(21) Appl. No.: 10/921,646

(22) Filed: Aug. 19, 2004

(65) Prior Publication Data

US 2006/0041116 A1 Feb. 23, 2006

(51) Int. Cl.
 C08B 3/20 (2006.01)
 C08B 15/06 (2006.01)
 C08B 15/10 (2006.01)
 C07H 15/26 (2006.01)

(52) U.S. Cl. .......................... 536/31; 502/11; 502/516; 210/660; 210/661; 210/679; 210/681; 210/682; 210/683; 210/684; 210/685; 210/686; 210/687; 210/688; 252/179; 252/180; 252/181; 536/17.4; 536/44; 536/63; 536/85; 536/87; 536/89; 536/91

(58) Field of Classification Search ............... 502/11, 502/516; 210/660, 661, 679, 681, 682, 683, 210/684, 685, 686, 687, 688; 252/179, 180, 252/181; 536/17.4, 31, 44, 63, 85, 87, 89, 536/91

See application file for complete search history.

(56) References Cited

U.S. PATENT DOCUMENTS

| | | | | |
|---|---|---|---|---|
| 4,629,470 A * | 12/1986 | Harper, Jr. | ...................... | 8/585 |
| 4,711,640 A | 12/1987 | Harper, Jr. | ...................... | 8/481 |
| 4,780,102 A | 10/1988 | Harper, Jr. | ...................... | 8/196 |
| 5,873,909 A | 2/1999 | Brodmann | ...................... | 8/403 |
| 5,910,622 A | 6/1999 | Brodmann | ...................... | 8/182 |
| 6,537,947 B1 | 3/2003 | Johns | ...................... | 502/416 |

OTHER PUBLICATIONS

Blanchard, E.J., et al., "Dyeability of Citric Acid Crosslinked Cotton Containing Amine or Quaternary Ammonium Salt Additives", *Colourage Annual*, pp. 37-50, 1993.
Cardamone, J.M., et al., "Modifying Wool/Cotton Textiles for Union Dyeing", *Textile Chemist and Colorist*, vol. 29(9), pp. 30-36, Sep. 1997.
Harper, R.J, et al., "Cationic Cotton Plus Easy Care", Text. Chem. Color., vol. 18(11), pp. 33-35, Nov. 1986.
Cardamone, J.M., et al., "Pretreatment of Wool/Cotton for Union Dyeing, Part 1: Resins Plus Choline Chloride", *Textile Chemist and Colorist*, vol. 28, pp. 19-23, 1996.
Ibrahim, N.A., et al., "ECO-Friendly Durable Press Finishing of Cellulose-Containing Fabrics", *J. Appl. Polym. Sci.*, vol. 84, pp. 2243-2253 (2002).
Simkovic, I., "Quaternization/Cross Linking of Starch with Choline Chloride/Epichlorohydrin", *Carbohydrate Polymers*, vol. 34, pp. 21-23 (1997).
Wing, R.E., "Starch Citrate: Preparation and Ion Exchange Properties", *Starch/Stärke*, vol. 48, pp. 275-279 (1996).
Marshall, W.E., et al., "Enhanced Metal Adsorption by Soybean Hulls Modified with Citric Acid", *Bioresource Technology*, vol. 69, pp. 263-268 (1999).

\* cited by examiner

*Primary Examiner*—Peter O'Sullivan
(74) *Attorney, Agent, or Firm*—John D. Fado; G. Byron Stover

(57) ABSTRACT

A process for the production of dual-functional ion exchange resins from lignocellulosic agricultural material involving anionization of the lignocellulosic agricultural material with citric acid and then cationization of the lignocellulosic agricultural material with dimethyloldihydroxyethylene urea (DMDHEU) and choline chloride, or cationization of the lignocellulosic agricultural material with DMDHEU and choline chloride and then anionization of the lignocellulosic agricultural material with citric acid.

18 Claims, No Drawings

DUAL-FUNCTIONAL ION EXCHANGE RESINS FROM AGRICULTURAL BY-PRODUCTS

BACKGROUND OF THE INVENTION

The present invention concerns a process for the production of dual-functional ion exchange resins from lignocellulosic agricultural material involving anionization of the lignocellulosic agricultural material with citric acid and then cationization of the lignocellulosic agricultural material with dimethyloldihydroxyethylene urea (DMDHEU) and choline chloride, or cationization of the lignocellulosic agricultural material with DMDHEU and choline chloride and then anionization of the lignocellulosic agricultural material with citric acid.

Ion exchange resins are adsorbents that effectively remove anions or cations from various types of industrial and municipal wastewater, storm water, and residential drinking water. Contamination of these water sources by anionic and cationic environmental pollutants is a significant problem in many parts of the United States. Thus the demand for ion exchange resins in the United States is currently about 280 million pounds and is expected to increase at about 5% per year for the forseeable future. Ion exchange resins, which can be produced by graft polymerization of functional anionic or cationic groups onto a synthetic bead comprised of polymers of styrene and divinylbenzene or produced by chemical attachment of either anionic or cationic functional groups on a natural polymer such as cellulose, are most commonly used to remove toxic or potentially toxic metal ions such as cadmium, copper or lead and anions that contain arsenic, selenium or chromium.

Agricultural by-products as a whole exceed 700 billion pounds per crop year. Most of these by-products are considered to be low-value waste with little ion exchange activity. While various methodologies exist for the creation of anion or cation exchange properties on plant by-products and cellulosic fibers, there remains a need to create dual-functional ion exchange materials from agricultural by-products that are cost effective and simultaneously efficacious toward both anions and cations of environmental concern. The present invention relates to the development of specifically modified agricultural by-products that possess enhanced adsorption properties with respect to the uptake of both anions and cations.

SUMMARY OF THE INVENTION

A process for the production of dual-functional ion exchange resins from lignocellulosic agricultural material involving anionization of the lignocellulosic agricultural material with citric acid and then cationization of the lignocellulosic agricultural material with dimethyloldihydroxyethylene urea (DMDHEU) and choline chloride, or cationization of the lignocellulosic agricultural material with DMDHEU and choline chloride and then anionization of the lignocellulosic agricultural material with citric acid.

DETAILED DESCRIPTION OF THE INVENTION

We have now developed a novel process which effects the creation of dual-functional ion exchange resins from lignocellulosic agricultural waste for the enhanced adsorption of inorganic cations and anions in solution. This method initially involves the reaction of agricultural by-products with citric acid, followed by a reaction with dimethyloldihydroxyethylene urea (DMDHEU) and choline chloride. However, there are variations on this reaction that create dual-functional ion exchange resins with different efficacies toward cations and anions of interest; these variations are described below.

In the first reaction, upon heating the by-product in the presence of citric acid, the citric acid is converted to the reactive or citric anhydride form that reacts predominantly with the primary alcoholic moiety ($-CH_2OH$) on glucose molecules contained within the cellulose portion of the lignocellulosic by-product. The product of this reaction is a glucose-citric acid ester containing two carboxyl groups, thus imparting anionic or negative character to the by-product.

In the second reaction, without being bound by theory, it is the believed that in the presence of heat, the primary alcoholic moiety ($-CH_2OH$) on glucose molecules in the cellulose polymer contained on or near the by-product surface react with one of the -methylol ($-NCH_2OH$) groups of DMDHEU. Without being bound by theory, it is also believed that, in the presence of heat, the primary alcoholic group ($-CH_2OH$) on choline chloride reacts with the other $-NCH_2OH$ group of DMDHEU. Therefore, DMDHEU is a bridging group linking cationic choline chloride and the lignocellulosic by-product. The resulting modified by-product contains both cationic and anionic groups which will bind anions and cations from solution. This product is unique in that the amount of anions and cations adsorbed on a single resin can be altered as needed by altering the reaction conditions required to produce the resin. Without being bound by theory, it is also believed that increasing reaction time or temperature will crosslink the negatively charged carboxyl groups and drive maximum adsorption towards the positively charged groups from the DMDHEU/choline chloride reaction. Adsorption of anions and cations is also pH dependent, so the maximum adsorption will take place at the optimal pH for the ion of interest.

Variations on the above sequence of reactions include exposing the lignocellulosic material to DMDHEU/choline chloride initially whereby this reaction can be followed by exposure of the cationic material to citric acid. Moreover, reaction of the lignocellulosic material with DMDHEU/choline chloride can take place via a two step process whereby DMDHEU is reacted with the lignocellulosic material initially, excess DMDHEU removed, and the choline chloride is reacted with the DMDHEU which is bound to the lignocellulosic material. This two step process can occur in the presence or absence of bound citric acid.

The present invention involves the creation of dual-functional ion exchange resins, from agricultural by-products, that possess enhanced adsorption of both anions and cations compared to unmodified by-products. The source material for the resins of the present invention may be any lignocellulosic material of plant origin (e.g., having a combined cellulose and hemicellulose content greater than or equal to fifty percent (dry weight) and possessing a bulk density of less than 0.5 grams per cubic centimeter when measured for particles possessing a size range of 10 to 20 U.S. mesh). Thus a wide range of soft, lignocellulosic materials may be used which includes hulls of seed producing agricultural plants and fibrous plant parts such as stalks or stems of agricultural plants. Examples include soybean hulls, rice hulls, oat hulls, wheat hulls, cottonseed hulls, corn cobs, peanut shells, almond hulls, macadamia nut hulls, and the stalks or stems of rice, oat, wheat, corn, barley, and sugarcane. Preferred materials are corn stover, soybean hulls, almond hulls, macadamia nut hulls, and sugarcane bagasse.

According to the present invention, the agricultural by-product material is modified with citric acid to impart anionic character and is then modified with dimethyloldihydroxyethylene urea (DMDHEU) and choline chloride to impart cationic character to the by-product. The creation of a negative surface charge on the by-product is achieved by mixing the lignocellulosic material with citric acid (generally in a molar range of about 0.3 to about 1.5 (e.g., 0.3 to 1.5), preferably about 0.6 to about 1.2 molar (e.g., 0.6 to 1.2), and at a by-product:citric acid ratio in the range of about 1:2 to about 1:7 (e.g., 1:2 to 1:7; preferably about 1:5 to about 1:7 (e.g., 1:5 to 1:7)) on a wt/wt basis)(the by-product material should be mixed and in contact with the reactant solution until the material is saturated with the reactant solution, usually 0.5–2 hours). The by-product is allowed to contact the citric acid solution for about 0.5 to about 2 hours (e.g., 0.5 to 2 hours; preferably about one hour (e.g., one hour)); while no maximum contact time is seen to exist, times in excess of 2 hours are not believed to result in any appreciable benefit. The by-product/citric acid slurry is then dried (generally at about 40° to about 80° C. (e.g., 40° to 80° C.; preferably at about 55° to about 65° C. (e.g., 55° to 65° C.)) for about 1 to about 3 hours (e.g., 1 to 3 hours; preferably for about 1.5 to about 2.5 hours (e.g., 1.5 to 2.5 hours)). The dried product is then heated (generally to about 110° to about 130° C. (e.g., 110° to 130° C.; preferably the reaction temperature is about 120° C. (e.g., 120° C.) for about 1 to about 3 hours (e.g., 1 to 3 hours; preferably the reaction time is about 1.5 to about 2.5 hours (e.g., 1.5 to 2.5 hours)); reaction times greater than 3 hours can cause considerable darkening of the product which may lead to excessive leaching of the dark color component when the product is used. Removal of excess or non-reacted citric acid from the by-product after heating takes place by washing the product with water in a stepwise manner. The number of individual washing steps is preferably 2 to 4 such steps (the preferred range of by-product to water ratios is about 1:20 to about 1:40 (e.g., 1:20 to 1:40) at a preferred temperature range of about 25° to about 40° C. (e.g., 25° to 40° C.)); carrying out more than 4 consecutive washing steps is not believed to result in any further measurable citric acid being removed. The product is then dried (preferably at about 60° to about 80° C. (e.g, 60° to 80° C.) for about 4 to about 6 hours (e.g., 4 to 6 hours)).

The creation of a positive surface charge on the by-product is achieved by mixing the citric acid modified particles with solutions of DMDHEU and choline chloride (the by-product material should be mixed and in contact with the reactant solution until the material is saturated with the reactant solution, usually 0.5–2 hours). The concentration of DMDHEU needed to achieve the desired modification is in the range of about 2 to about 12% (wt/wt)(e.g., 2 to 12%; preferably about 4 to about 12% (e.g., 4 to 12%)). The concentration of choline chloride required to achieve the desired modification is in the range of about 2 to about 12% (wt/wt)(e.g., 2 to 12%; preferably about 6 to about 10% (e.g., 6 to 10%)). Solutions are mixed with the particular by-product at a preferred ratio of 10 ml of DMDHEU and/or choline chloride solution per gram of by-product. The by-product is allowed to contact the DMDHEU and/or choline chloride solution for about 0.5 to about 2 hours (e.g., 0.5 to 2 hours; preferably about one hour (e.g., one hour). The pH of the slurry is adjusted to a preferred pH range of about 4 to about 4.5 (e.g., 4 to 4.5). The slurries are dried (preferably at about 60° to about 80° C. (e.g., 60° to 80° C.) and then reacted at a temperature range of about 100° to about 200° C. (e.g., 100° to 200° C.; preferably about 140° to about 180° C. (e.g., 140° to 180° C.)) for a time ranging from about 0.25 to about 4 hours (e.g., 0.25 to 4 hours; preferably about 1 to about 3 hours (e.g., 1 to 3 hours)). Removal of excess or non-reacted DMDHEU and choline chloride from the by-product after the reaction step takes place by washing the product with water in a stepwise manner. The number of individual washing steps is in the preferred range of 2 to 4 such steps (with a preferred range of by-product to water ratios of about 1:20 to about 1:40 (e.g., 1:20 to 1:40) at a temperature in the preferred range of about 25° to about 40° C. (e.g., 25° to 40° C.)); carrying out more than 4 consecutive washing steps is not believed to result in any further measurable DMDHEU and choline chloride being removed. The product is then dried (preferably at about 50° C. to about 80° C. (e.g., 50° C. to 80° C.)) at a preferred drying time of about 4 to about 6 hours (e.g., 4 to 6 hours). Alternatively, DMDHEU and choline chloride may be used sequentially; in other words using DMDHEU under the above conditions followed by cationization using choline chloride using the above conditions.

Alternatively, the positive surface charge on the by-product may be created first (cationization), followed by creation of the negative surface charge (anionization) using the reaction conditions described above.

The dual-functional products thus produced have a range of adsorption efficiencies for both anions and cations in solution. The range of adsorption values depends on the extent or degree of modification of the by-product with both citric acid and DMDHEU/choline chloride. Without being bound by theory, a major factor in the effectiveness of the quaternization reaction with DMDHEU/choline chloride and the ability of the dual-functional particles to adsorb cations is the degree or extent of cross-linking that occurs within or between particles. Cross-linking occurs because both citric acid in its anhydride form or DMDHEU can react with adjacent primary alcoholic groups (—CH$_2$OH) on glucose located in cellulose polymers either in the same lignocellulosic particle or across adjacent particles. The effect of cross-linking from the above reactions is a diminution in the ability of the by-product to adsorb cations or anions because the once free carboxyl groups from citric acid or the once free —NCH$_2$OH groups of DMDHEU have now formed ester or ether linkages, respectively, with glucose moieties in cellulose.

In order to retain the dual functionality of this invention, a balance must be achieved between the optimum reaction temperature of DMDHEU/choline chloride attachment and the optimum temperature for citric acid modification. The control of the reaction conditions can be tailored to the adsorption characteristics desired by driving the reaction efficiencies towards anion or cation adsorption depending upon reaction time and temperature. Citric acid and DMDHEU/choline chloride modifications can be run in a reverse order, adding cationic groups before anionic groups to the by-product surface. It is further theorized that the above reactions are instrumental in determining the ability of the dual-functional particles to adsorb cations such as Cu(II), Zn(II), Ni(II), Cd(II), Pb(II), Cr(III), Hg(II), Al(III), Co(II), Sn(II), Sn(IV), Ca(II), and Mg(II), and anions such as Cr(VI), As(V) and Se(VI).

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Example 1

Soybean hulls were obtained from Owensboro Grain Co., Owensboro, Ky. Sugarcane bagasse was obtained from Nicholls State University, Thibodaux, La. Corn stover was obtained from Iowa State University, Ames, Iowa All by-products were milled in a Retsch SK cross beater mill (Glen Mills Inc., Clifton, N.J.) and sieved to retain the 10×20 mesh (0.85–2.00 mm) fraction.

Soybean hulls or corn stover were mixed with 0.6 M citric acid solution at a by-product:citric acid ratio of 1:7. Because of sugarcane bagasse's ability to imbibe more water than the other by-products, 0.3 M citric acid was added to sugarcane bagasse at a by-product:citric acid ratio of 1:14. Therefore, each by-product was exposed to the same amount of citric acid. All by-products were allowed to imbibe citric acid for 30 min at 25° C., then the slurries were dried at 60° C. After drying, the mixture was heated to 120° C. for 1.5 hr in a forced air oven. The reacted by-products were washed twice at a 1:40 ratio of sample to water and dried at 60° C. overnight.

After citric acid modification, a three gram sample of each by-product was added to 30 ml of a solution containing 4% DMDHEU in the form of Permafresh EFX (Omnova Solutions, Inc., Chester, S.C.) and 6% choline chloride (Aldrich Chemical Co., Inc., Milwaukee, Wis.). The pH was adjusted to between 4 and 4.5 and the samples were allowed to dry at 60° C. The dried samples were heated to 180° C. for 2 hours in a forced air oven. The reacted samples were subjected to two successive washings by stirring them for 1 hour each at a sample:water ratio of 1:40, then dried at 60° C.

For the reverse reaction, whereby the by-products are reacted with DMDHEU/choline chloride followed by modification with citric acid, the following procedure was used. A three gram sample of each by-product was added to 30 ml of 4% DMDHEU and 6% choline chloride. The DMDHEU/choline chloride modified products were then reacted with citric acid as described above. The remainder of the procedure was the same as described above.

Product yields were determined on the final products in accord with the following equation:

Product yield (%)=[(Wt$_p$÷Wt$_{sm}$)×100]

where Wt$_p$=dry weight in g of the final product and Wt$_{sm}$=dry weight in g of the source or starting material.

Copper and chromate ions represent typical cation and anion species, respectively, commonly found in industrial effluent sources. The adsorption of copper and chromium ions was determined by batch analyses using 0.25 g samples of unmodified or modified by-products in 25 ml of 20 mM potassium chromate or copper chloride solution. The high concentrations of cation and anion were used to determine a "one-point" adsorption capacity measurement on each sample. Concentrations of 20 mM saturate the binding sites of the four adsorbents and give an approximate value of the adsorption capacity. For the analysis of copper ion the sample pH values were adjusted to pH 5, and for the analysis of chromate ion the pH was adjusted to pH 3. Both of these pH values represented the pH at which approximately maximum adsorption occurred for each ion. All suspensions were stirred at 300 rpm for 24 hr at 25° C. The solutions were filtered through 0.45 mm filters and diluted in 4% Ultrex HNO$_3$. Chromium concentrations were determined on the filtrates after suitable dilutions using a Leeman Labs Profile ICP-AES spectrometer at 267 nm with an axial torch and dual view capabilities (Leeman Labs, Hudson, N.H.). Copper adsorption was determined on the filtrates at 324 nm. All ion exchange material was dried to a moisture content of approximately 10% or less before adsorption analyses were conducted. The results are presented in Table 1:

TABLE 1

| By-product | Product Yield (%) | Chromium ion (as chromate) adsorption (mmol)/g | Copper ion adsorption (mmol/g) |
|---|---|---|---|
| Untreated | | | |
| Soybean hulls | N/A | 0.26 | 0.41 |
| Sugarcane bagasse | N/A | 0.35 | 0.02 |
| Corn stover | N/A | 0.35 | 0.30 |
| Citric acid, then DMDHEU/choline chloride treated | | | |
| Soybean hulls | 118 | 0.75 | 0.63 |
| Sugarcane bagasse | 109 | 0.67 | 1.01 |
| Corn stover | 132 | 0.88 | 0.70 |
| DMDHEU/choline chloride, then citric acid treated | | | |
| Soybean hulls | 111 | 0.65 | 1.21 |
| Sugarcane bagasse | 125 | 0.57 | 0.82 |
| Corn stover | 124 | 0.73 | 0.99 |

N/A = not applicable

Yields were similar for the two sets of products and all yields were above 100%. Yields were surprisingly high because (1) the added citric acid in addition to the added DMDHEU/choline chloride increased the initial weight of the by-products and (2) there was little loss of by-product during the modification and washing steps. High product yields can ultimately result in lower product costs during manufacturing. The adsorption values represent "one-point" adsorption capacities since 20 mM ion concentrations used in this study were sufficient to saturate the binding sites for the adsorbents. "One-point" adsorption capacities represent a rapid approach to estimating the ion load for a particular ion exchange resin.

The two sets of products showed different "one-point" adsorption capacities toward chromate ion and copper ion. Table 1 shows a significant increase of 63 to 188% in chromate adsorption for the modified samples compared to the unmodified by-products. Moreover, significant anionic character was added as evidenced by the increase in copper ion adsorption, especially in the sugarcane bagasse sample compared to the untreated samples. Adsorption of chromium was increased by 13 to 32% when cationization occurred last compared to when it occurred first, and copper ion adsorption increased by 16 to 48% in two of the three modified by-products when anionization occurred last compared to when it occurred first. Therefore, the last modification applied appeared to dictate which functionality of the dual-functional resin will predominate. Total "one-point" adsorption capacities were 1.38 to 1.68 mmol/g for samples where citric acid was applied first and 1.39 to 1.86 mmol/g for samples where citric acid was applied last. There was considerable overlap in adsorption values. Different products with different adsorption characteristics can be produced depending on which adsorption characteristics are required in a particular situation.

Example 2

In this example, a variation of the two step procedure was undertaken. In the first variation, by-products were first modified with citric acid, secondly the citric acid-modified product was modified with DMDHEU, and the third and final step involved modification with choline chloride. Three gram samples of citric acid modified by-products were added to 30 ml of 4% DMDHEU. The pH was adjusted to between 4 and 4.5 and the samples were allowed to dry at 60° C. The samples were heated for 0.5 hours at 140° C. They were washed 3 times at a 1:40 ratio of sample to water and dried. The previously reacted DMDHEU samples were added to 30 ml 6% choline chloride. The pH was adjusted to between 4 and 4.5 and the samples were allowed to dry at 60° C. The samples were heated at 140° C. for 0.5 hours, then washed and dried as described above.

In the second variation, by-products were first modified with DMDHEU, then choline chloride was added as a separate or second step. Finally the product modified separately with DMDHEU and then choline chloride was exposed to citric acid for the third and final modification. Thirty ml of 10% DMDHEU was added to 3 grams of each by-product. The pH was adjusted to between 4 and 4.5 and the samples were allowed to dry at 60° C. After drying at 60° C., the samples were heated for 2 hours at 180° C. The samples were washed as described above. They were then added to 30 ml of 8% choline chloride, dried and reacted again for 2 hours at 180° C. The resulting products were washed and dried and added to 21 ml of 0.6 M citric acid as described in Example 1. Product yield and "one point" adsorption capacities were determined as given under Example 1. The results are described in Table 2. In addition, Table 2 compares all of the dual-functional by-products developed by methods described herein. Comparisons are also made among untreated samples and typical commercial cation and anion exchange resins.

TABLE 2

| By-product | Product Yield (%) | Chromium ion (as chromate) adsorption (mmol)/g | Copper ion adsorption (mmol/g) |
| --- | --- | --- | --- |
| Untreated: | | | |
| Soybean hulls | N/A | 0.26 | 0.41 |
| Sugarcane bagasse | N/A | 0.35 | 0.02 |
| Corn stover | N/A | 0.35 | 0.30 |
| Citric acid, then DMDHEU/choline chloride treated: | | | |
| Soybean hulls | 136 | 0.75 | 0.63 |
| Sugarcane bagasse | 116 | 0.67 | 1.01 |
| Corn stover | 141 | 0.88 | 0.70 |
| DMDHEU/choline chloride, then citric acid treated: | | | |
| Soybean hulls | 119 | 0.65 | 1.21 |
| Sugarcane bagasse | 136 | 0.57 | 0.82 |
| Corn stover | 138 | 0.73 | 0.99 |
| 3-step reaction of citric acid-DMDHEU-choline chloride: | | | |
| Soybean hulls | 111 | 0.68 | 0.86 |
| Sugarcane bagasse | 85 | 0.60 | 0.58 |
| Corn stover | 101 | 0.76 | 0.58 |
| 3-step reaction of DMDHEU-choline chloride-citric acid: | | | |
| Soybean hulls | 100 | 0.64 | 0.85 |
| Sugarcane bagasse | 95 | 0.60 | 1.21 |
| Corn stover | 95 | 0.62 | 1.24 |
| Commercial resins: (Synthetic) | | | |
| Amberlite IRA-400 | N/A | 2.14 | 0.07 |
| Amberlite IRC-86 (Cellulose-based) | N/A | 0.09 | 2.06 |
| Whatman QA-52 | N/A | 0.72 | <0.01 |
| Whatman CM-52 | N/A | 0.04 | 0.4 |

N/A = Not available

Yields were consistently lower in samples modified by a 3-step reaction of citric acid-DMDHEU-choline chloride. Generally, the greatest adsorption of chromium took place in samples where DMDHEU/choline chloride was added last, regardless of reaction type (2-step or 3-step). Conversely, the greatest adsorption of copper occurred in samples where citric acid was added last. Again, as explained under Example 1 but reemphasized here, the last modification applied appears to dictate which functionality of the dual-functional resin will predominate. In terms of overall adsorption (adsorption of chromium plus copper), generally the highest overall adsorption resulted from the reactions where DMDHEU/choline chloride was reacted first (either together or stepwise) followed by the reaction with citric acid. The increase in DMDHEU/choline chloride concentration in the 3-step reaction, where citric acid addition was the last step, increased chromium adsorption without compromising copper adsorption.

The four sets of dual-functional resins were compared to both commercial synthetic and cellulose-based ion exchange resins for the adsorption of chromium ion or copper ion (Table 2). The commercial resins evaluated vary in their chemical makeup. Amberlite IRC-86 is a synthetic cation exchange resin that has carboxyl groups grafted onto a polymeric backbone. QA-52 is a cellulose-based resin with added quaternary ammonium groups. CM-52 is a resin with added carboxymethyl groups. Amberlite IRA-400 is quaternary ammonium substituted polystyrene-based resin. However, none of the commercial resins evaluated exhibited dual functionality in attracting both cations and anions.

Example 3

In order to ascertain "real world" effectiveness of the dual-functional ion exchange resins, the four types of resins in Example 2 plus the commercial resins from Example 2 were used to remove a group of cations and anions from a simulated contaminated water prepared by dissolving three cations (cadmium, copper and lead) and three anions (chromium, arsenic and selenium) that are on the U.S. Environmental Protection Agency (US EPA) list of dangerous pollutants and for which maximum contaminant levels (MCLs) have been identified. Adsorption data were obtained at two concentration levels. The first level was 10 times (10×) the MCLs of 0.005 ppm for cadmium, 1.3 ppm for copper, 0.015 ppm for lead, 0.050 ppm for arsenic, 0.100 ppm for chromium, and 0.050 ppm for selenium. The second level was 50 times these MCLs. Concentrations at or between these two levels are common in samples obtained from contaminated drinking water and municipal and industrial wastewater. Synthetic wastewater samples at 10× and 50× the MCL's of cadmium, copper, lead, arsenic, chromium and selenium were made up in a 0.07 M sodium acetate-0.03 M acetic acid acetic acid buffer at pH 4.8 to prevent metal precipitation. The adsorption of these ions was determined by batch analyses using 0.25 g samples of unmodified or modified by-products in 25 ml of solution. All suspensions were stirred at 300 rpm for 24 hr at 25° C. The solutions were filtered through 0.45 mm filters and diluted in 4% Ultrex $HNO_3$. Concentrations were determined on the filtrates after suitable dilutions using a Leeman Labs Profile ICP-AES spectrometer using the following wavelengths using an axial view: As-193.695 nm, Se-196.026 nm, Cd-214.438 nm, Pb-220.353 nm, Cr-267.716 nm, and Cu-324.754 nm. The results are shown in Tables 3 and 4:

TABLE 3

Adsorption of Cations and Anions at 10 X the EPA limits for Drinking Water

Values given as percent of initial ion concentration removed[a]

| Sample | Cations | | | Anions | | |
|---|---|---|---|---|---|---|
| | Cadmium | Copper | Lead | Arsenic | Chromium | Selenium |
| 10x US EPA limit | | | | | | |
| Untreated by-products | | | | | | |
| Soybean hulls | 100[b] | 97 | 100 | 0.0 | 16 | 6.9 |
| Sugarcane bagasse | 45 | 87 | 100 | 0.0 | 77 | 3.2 |
| Corn stover | 95 | 89 | 100 | 0.0 | 7.9 | 2.6 |
| CA-DMDHEU-CC | | | | | | |
| Soybean hulls | 98 | 99 | 100 | 0.0 | 92 | 8.3 |
| Sugarcane bagasse | 85 | 95 | 100 | 0.0 | 70 | 0.0 |
| Corn stover | 100 | 94 | 100 | 0.0 | 73 | 0.0 |
| DMDHEU-CC-CA | | | | | | |
| Soybean hulls | 100 | 99 | 100 | 5.7 | 63 | 2.8 |
| Sugarcane bagasse | 100 | 92 | 100 | 5.5 | 41 | 0.6 |
| Corn stover | 100 | 92 | 100 | 3.0 | 44 | 0.0 |
| 3-step reaction of CA-DMDHEU-CC | | | | | | |
| Soybean hulls | 100 | 99 | 100 | 7.0 | 79 | 2.2 |
| Sugarcane bagasse | 100 | 93 | 100 | 7.1 | 83 | 9.1 |
| Corn stover | 100 | 93 | 100 | 1.9 | 81 | 11 |
| 3-step reaction of DMDHEU-CC-CA | | | | | | |
| Soybean hulls | 100 | 97 | 100 | 0.0 | 53 | 1.2 |
| Sugarcane bagasse | 80 | 88 | 100 | 0.0 | 23 | 2.0 |
| Corn stover | 98 | 89 | 100 | 0.0 | 34 | 0.0 |
| Commercial resins (Synthetic) | | | | | | |
| Amberlite IRA-400 | 8.8 | 0.0 | 0.0 | 26 | 94 | 95 |
| Amberlite IRC-86 | 100 | 99 | 100 | 0.0 | 43 | 0.0 |
| (Cellulose-based) | | | | | | |
| Whatman QA-52 | 3.0 | 0.7 | 11 | 13 | 37 | 55 |
| Whatman CM-52 | 94 | 87 | 99 | 3.4 | 15 | 0.7 |

[a]Means of duplicate samples
[b]Values below 0.01 ppm for Cr, As, and Se or 0.005 ppm for Cd and Pb, or 1 ppm for Cu in the filtrates were reported as 100% adsorption.

TABLE 4

Adsorption of Cations and Anions at 50 X the EPA limits for Drinking Water

Values given as percent of initial ion concentration removed[a]

| Sample | Cations | | | Anions | | |
|---|---|---|---|---|---|---|
| | Cadmium | Copper | Lead | Arsenic | Chromium | Selenium |
| 50x US EPA limit | | | | | | |
| Untreated by-products | | | | | | |
| Soybean hulls | 58 | 56 | 73 | 5.5 | 26 | 4.3 |
| Sugarcane bagasse | 14 | 20 | 35 | 3.9 | 55 | 1.7 |
| Corn stover | 26 | 30 | 46 | 0.8 | 14 | 2.1 |
| CA-DMDHEU-CC | | | | | | |
| Soybean hulls | 100[b] | 98 | 100 | 0.0 | 93 | 6.6 |
| Sugarcane bagasse | 100 | 92 | 100 | 0.0 | 69 | 0.0 |
| Corn stover | 77 | 93 | 100 | 0.0 | 77 | 0.7 |
| DMDHEU-CC-CA | | | | | | |
| Soybean hulls | 93 | 90 | 97 | 0.0 | 68 | 0.6 |
| Sugarcane bagasse | 86 | 83 | 88 | 1.2 | 50 | 1.0 |
| Corn stover | 87 | 84 | 90 | 0.0 | 57 | 0.0 |
| 3-step reaction of | | | | | | |
| CA-DMDHEU-CC | | | | | | |
| Soybean hulls | 100 | 97 | 92 | 6.0 | 81 | 2.0 |
| Sugarcane bagasse | 54 | 84 | 100 | 3.6 | 80 | 0.0 |
| Corn stover | 80 | 92 | 100 | 1.2 | 83 | 0.0 |
| 3-step reaction of | | | | | | |
| DMDHEU-CC-CA | | | | | | |
| Soybean hulls | 93 | 91 | 98 | 7.3 | 62 | 7.4 |
| Sugarcane bagasse | 83 | 80 | 88 | 2.1 | 30 | 4.3 |
| Corn stover | 81 | 81 | 88 | 0.0 | 41 | 0.0 |
| Commercial resins (Synthetic) | | | | | | |
| Amberlite IRA-400 | 8.8 | 0.0 | 0.0 | 27 | 95 | 95 |
| Amberlite IRC-86 | 100 | 99 | 100 | 0.0 | 43 | 0.0 |
| (Cellulose-based) | | | | | | |
| Whatman QA-52 | 3.0 | 0.7 | 11 | 13 | 37 | 55 |
| Whatman CM-52 | 94 | 87 | 99 | 3.4 | 15 | 0.7 |

[a]Means of duplicate samples
[b]Values below 0.01 ppm for Cr, As, and Se or 0.005 ppm for Cd and Pb, or 1 ppm for Cu in the filtrates were reported as 100% adsorption.

Table 3 shows that the 3-step modification starting with citric acid and ending with the addition of choline chloride produced a resin with perhaps the most favorable cation and anion removal. All types of cations and anions were removed but the percentage removal varied considerably between 1.9% for arsenic to 100% for cadmium and lead. By-products modified by this 3-step procedure surprisingly removed the same percentage of cations as the best commercial resin, Amberlite IRC-86, and exhibited chromium removal percentages similar to the best commercial resin for that purpose, namely Amberlite IRA-400. All the dual-functional resins surprisingly removed the same or greater percentage of cations than the commercial cellulose-based, cation exchange resin Whatman CM-52. Moreover, all the dual-functional resins surprisingly had a greater percentage adsorption for chromium than the commercial cellulose-based, anion exchange resin Whatman QA-52. Considering that the by-products employed as starting material for this invention consisted largely of cellulose, they surprisingly outperformed the commercial cellulose-based resins in percentage removal of cadmium, copper, lead, and chromium.

Table 4 shows that by-products modified with citric acid followed by a one-step modification with DMDHEU/choline chloride were effective in cation and chromium removal. In fact, the soybean hull-based, dual-functional resin prepared in this manner was surprisingly as efficient as the two best synthetic commercial resins in removing cations and chromium. Dual-functional resins, especially from soybean hulls, produced by the 3-step procedure employing citric acid, then DMDHEU and then choline chloride were also surprisingly effective at removing cations and chromium and also exhibited some percentage removal of arsenic and selenium.

Overall, many of the dual-functional resins were surprisingly more efficient at removing cations and chromium than the cellulose-based, commercial resins. Dual-functional resins were an advantage over commercial resins because the same dual-functional resin simultaneously removed a significant percentage of cations and anions while commercial resins were only effective at removing either cations or anions but not both.

All of the references cited herein are incorporated by reference in their entirety. Also incorporated by reference in their entirety are the following references: Blanchard et al., Colourage Annual 1993, pages 37–38, 40–42, 44–46, 50; Cardamone et al., Text. Chem. Color., 28: 19–23 (1996); Cardamone et al., Text. Chem. Color., 29: 30–36 (1997); Harper et al., Text. Chem. Color., 18: 33–35 (1986); Ibrahim et al., J. Appl. Polym. Sci., 84: 2243–2253 (2002); Marshall et al., Bioresource Technol., 69: 263–268 (1999); Simkovic, Carbohydr. Polym., 34: 21–23 (1997); Wing, Starch/Starke, 48: 275–279 (1996). Also incorporated by reference in their entirety are the following U.S. Pat. Nos. 4,629,470; 4,711,640; 4,780,102; 5,873,909; 5,910,622; 6,537,947.

Thus, in view of the above, the present invention concerns (in part) the following:

A process for the production of dual-functional ion exchange resins from lignocellulosic agricultural material, said process comprises (or consists essentially of or consists of) anionization of said material with citric acid and then cationization of said material with DMDHEU and choline chloride or said process comprises (or consists essentially of or consists of) cationization of said material with DMDHEU and choline and then anionization of said material with citric acid.

The above process, wherein said anionization comprises (or consists essentially of or consists of) mixing (and contacting) said material with citric acid to form a slurry, drying said slurry to form a dried product, heating said dried product to form a heated product, washing said heated product with water at least one time to form a washed product, and drying said washed product; and wherein said cationization comprises (or consists essentially of or consists of) mixing (and contacting) said material with DMDHEU and choline chloride to form a slurry, drying said slurry to form a dried product, heating said dried product to form a heated product, washing said heated product with water at least one time to form a washed product, and drying said washed product or said cationization comprises (or consists essentially of or consists of) (i) mixing said material with DMDHEU to form a slurry, drying said slurry to form a dried product, heating said dried product to form a heated product, washing said heated product with water at least one time to form a washed product, and drying said washed product, and then (ii) mixing said material with choline chloride to form a slurry, drying said slurry to form a dried product, heating said dried product to form a heated product, washing said heated product with water at least one time to form a washed product, and drying said washed product.

The above process, wherein said anionization comprises (or consists essentially of or consists of) mixing said material with citric acid to form a slurry, drying said slurry to form a dried product, heating said dried product to form a heated product, washing said heated product with water at least one time to form a washed product, and drying said washed product.

The above process, wherein said cationization comprises (or consists essentially of or consists of) mixing said material with DMDHEU and choline chloride to form a slurry, drying said slurry to form a dried product, heating said dried product to form a heated product, washing said heated product with water at least one time to form a washed product, and drying said washed product.

The above process, wherein said cationization comprises (or consists essentially of or consists of) (i) mixing said material with DMDHEU to form a slurry, drying said slurry to form a dried product, heating said dried product to form a heated product, washing said heated product with water at least one time to form a washed product, and drying said washed product, and then (ii) mixing said material with choline chloride to form a slurry, drying said slurry to form a dried product, heating said dried product to form a heated product, washing said heated product with water at least one time to form a washed product, and drying said washed product.

The above process, said process comprises (or consists essentially of or consists of) anionization of said material with citric acid and then cationization of said material with DMDHEU and choline chloride.

The above process, said process comprises (or consists essentially of or consists of) cationization of said material with DMDHEU and choline chloride and then anionization of said material with citric acid.

The above process, wherein said lignocellulosic agricultural material is a hull of a seed producing agricultural plant or a fibrous plant part or mixtures thereof.

The above process, wherein said lignocellulosic agricultural material is selected from the group consisting of soybean hulls, rice hulls, oat hulls, wheat hulls, cottonseed hulls, corn cobs, peanut shells, almond hulls, macadamia nut hulls, or mixtures thereof.

The above process, wherein said lignocellulosic agricultural material is selected from the group consisting of the stalks or stems of rice, oat, wheat, corn, barley, sugarcane, or mixtures thereof.

The above process, wherein said lignocellulosic agricultural material is selected from the group consisting of corn stover, soybean hulls, almond hulls, macadamia nut hulls, sugarcane bagasse, or mixtures thereof.

The above process, wherein said dual-functional ion exchange resins absorb at least one member selected from the group consisting of Cu(II), Zn(II), Ni(II), Cd(II), Pb(II), Cr(III), Hg(II), Al(III), Co(II), Sn(II), Sn(IV), Ca(II), Mg(II), Cr(VI), As(V), Se(VI), and mixtures thereof.

The above process, wherein said dual-functional ion exchange resins absorb at least one member selected from the group consisting of Cu(II), Zn(II), Ni(II), Cd(II), Pb(II), Cr(III), Hg(II), Al(III), Co(II), Sn(II), Sn(IV), Ca(II), Mg(II), and mixtures thereof.

The above process, wherein said dual-functional ion exchange resins absorb at least one member selected from the group consisting of Cr(VI), As(V), Se(VI), and mixtures thereof.

Dual-functional ion exchange resins produced by the above process.

The above dual-functional ion exchange resins, wherein said dual-functional ion exchange resins absorb at least one member selected from the group consisting of Cu(II), Zn(II), Ni(II), Cd(II), Pb(II), Cr(III), Hg(II), Al(III), Co(II), Sn(II), Sn(IV), Ca(II), Mg(II), Cr(VI), As(V), Se(VI), and mixtures thereof.

The above dual-functional ion exchange resins, wherein said dual-functional ion exchange resins absorb at least one member selected from the group consisting of Cu(II), Zn(II), Ni(II), Cd(II), Pb(II), Cr(III), Hg(II), Al(III), Co(II), Sn(II), Sn(IV), Ca(II), Mg(II), and mixtures thereof.

The abaove dual-functional ion exchange resins, wherein said dual-functional ion exchange resins absorb at least one member selected from the group consisting of Cr(VI), As(V), Se(VI), and mixtures thereof.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A process for the production of dual-functional ion exchange resins from lignocellulosic by-product agricultural material, said process comprises anionization of said material with citric acid and then cationization of said material with DMDHEU and choline chloride or said process comprises cationization of said material with DMDHEU and choline chloride and then anionization of said material with citric acid.

2. The process according to claim 1, wherein said anionization comprises mixing said material with citric acid to form a slurry, drying said slurry to form a dried product, heating said dried product to form a heated product, washing said heated product with water at least one time to form a washed product, and drying said washed product; and wherein said cationization comprises mixing said material with DMDHEU and choline chloride to form a slurry, drying said slurry to form a dried product, heating said dried product to form a heated product, washing said heated product with water at least one time to form a washed product, and drying said washed product or said cationization comprises (i) mixing said material with DMDHEU to form a slurry, drying said slurry to form a dried product, heating said dried product to form a heated product, washing said heated product with water at least one time to form a washed product, and drying said washed product, and then (ii) mixing said material with choline chloride to form a slurry, drying said slurry to form a dried product, heating said dried product to form a heated product, washing said heated product with water at least one time to form a washed product, and drying said washed product.

3. The process according to claim 1, wherein said anionization comprises mixing said material with citric acid to form a slurry, drying said slurry to form a dried product, heating said dried product to form a heated product, washing said heated product with water at least one time to form a washed product, and drying said washed product.

4. The process according to claim 1, wherein said cationization comprises mixing said material with DMDHEU and choline chloride to form a slurry, drying said slurry to form a dried product, heating said dried product to form a heated product, washing said heated product with water at least one time to form a washed product, and drying said washed product.

5. The process according to claim 1, wherein said cationization comprises (i) mixing said material with DMDHEU to form a slurry, drying said slurry to form a dried product, heating said dried product to form a heated product, washing said heated product with water at least one time to form a washed product, and drying said washed product, and then (ii) mixing said material with choline chloride to form a slurry, drying said slurry to form a dried product, heating said dried product to form a heated product, washing said heated product with water at least one time to form a washed product, and drying said washed product.

6. The process according to claim 1, said process comprises anionization of said material with citric acid and then cationization of said material with DMDHEU and choline chloride.

7. The process according to claim 1, said process comprises cationization of said material with DMDHEU and choline chloride and then anionization of said material with citric acid.

8. The process according to claim 1, wherein said lignocellulosic agricultural material is a hull of a seed producing agricultural plant or a fibrous plant part or mixtures thereof.

9. The process according to claim 1, wherein said lignocellulosic agricultural material is selected from the group consisting of soybean hulls, rice hulls, oat hulls, wheat hulls, cottonseed hulls, corn cobs, peanut shells, almond hulls, macadamia nut hulls, or mixtures thereof.

10. The process according to claim 1, wherein said lignocellulosic agricultural material is selected from the group consisting of the stalks or stems of rice, oat, wheat, corn, barley, sugarcane, or mixtures thereof.

11. The process according to claim 1, wherein said lignocellulosic agricultural material is selected from the group consisting of corn stover, soybean hulls, almond hulls, macadamia nut hulls, sugarcane bagasse, or mixtures thereof.

12. The process according to claim 1, wherein said dual-functional ion exchange resins absorb at least one member selected from the group consisting of Cu(II), Zn(II), Ni(II), Cd(II), Pb(II), Cr(II), Hg(II), Al(III), Co(II), Sn(II), Sn(IV), Ca(U), Mg(II), Cr(VI), As(V), Se(VI), and mixtures thereof.

13. The process according to claim 1, wherein said dual-functional ion exchange resins absorb at least one member selected from the group consisting of Cu(II), Zn(II), Ni(II), Cd(II), Pb(II), Cr(III), Hg(II), Al(III), Co(II), Sn(II), Sn(IV), Ca(II), Mg(II), and mixtures thereof.

14. The process according to claim 1, wherein said dual-functional ion exchange resins absorb at least one member selected from the group consisting of Cr(VI), As(V), Se(VI), and mixtures thereof.

15. Dual-functional ion exchange resins produced by the process of claim 1.

16. The dual-functional ion exchange resins according to claim 15, wherein said dual-functional ion exchange resins absorb at least one member selected from the group consisting of Cu(II), Zn(II), Ni(II), Cd(II), Pb(II), Cr(III), Hg(II), Al(III), Co(II), Sn(II), Sn(IV), Ca(II), Mg(II), Cr(VI), As(V), Se(VI), and mixtures thereof.

17. The dual-functional ion exchange resins according to claim 15, wherein said dual-functional ion exchange resins absorb at least one member selected from the group consisting of Cu(II), Zn(II), Ni(II), Cd(II), Pb(II), Cr(III), Hg(II), Al(III), Co(II), Sn(II), Sn(IV), Ca(II), Mg(II), and mixtures thereof.

18. The dual-functional ion exchange resins according to claim 15, wherein said dual-functional ion exchange resins absorb at least one member selected from the group consisting of Cr(VI), As(V), Se(VI), and mixtures thereof.

* * * * *